United States Patent [19]

Philipps

[11] Patent Number: 5,051,847
[45] Date of Patent: Sep. 24, 1991

[54] MAGNETIC HEAD DRIVER AMPLIFIER FOR OBLIQUE TRACK RECORDING TAPE

[75] Inventor: Michael Philipps, Darmstadt, Fed. Rep. of Germany

[73] Assignee: BTS Broadcast Television Systems GmbH, Darmstadt, Fed. Rep. of Germany

[21] Appl. No.: 328,002

[22] Filed: Mar. 23, 1989

[30] Foreign Application Priority Data

Apr. 2, 1988 [DE] Fed. Rep. of Germany ....... 3811327

[51] Int. Cl.$^5$ .................... G11B 5/09; G11B 15/14; G11B 5/02
[52] U.S. Cl. ........................................ 360/46; 360/64; 360/68
[58] Field of Search ............... 360/46, 61, 67, 68, 360/64

[56] References Cited

U.S. PATENT DOCUMENTS 4,477,846 10/1984 Cottrell et al. .................. 360/46
4,647,988 3/1987 Takehara ........................ 360/46
4,905,104 2/1990 Okamoto et al. ................ 360/64

OTHER PUBLICATIONS

"Towards Take Off of the 4:2:2 DUTR" by Eguchi et al., 1985.

Primary Examiner—David J. Severin
Assistant Examiner—Won Tae Christopher Kim
Attorney, Agent, or Firm—Frishauf, Holtz, Goodman & Woodward

[57] ABSTRACT

A differential amplifier (15, 16) which drives a recording head and is located on the headwheel which carries the recording head is equipped with automatic switchover provided by a transistor (18) in series with a resistance and the emitters of the differential amplifier. In the absence of signals in the rotor of the rotary transformer which supplies signals to be amplified for recording, this differential amplifier has substantially no idling current, but in response to the presence of a signal in the rotor, a switchover signal is provided making the transistor (18) in the emitter circuit of the differential amplifier conductive and putting the differential amplifier into class A operation. As a result, digital video signals can be recorded at a high data rate without distortion, whereas unintended erasure of the magnetic tape by direct current components in the winding of the recording head is prevented.

6 Claims, 2 Drawing Sheets

MAGNETIC HEAD DRIVER AMPLIFIER FOR OBLIQUE TRACK RECORDING TAPE

The invention concerns an amplifier for driving a magnetic recording head on a revolving head wheel which is supplied with signals for recording through a rotary transformer. The tape is guided to advance along a loop in which it is in contact with the magnetic heads mounted on the headwheel.

An amplifying circuit of the above described kind interconnecting the rotor of a rotary transformer and a magnetic head revolving on a head wheel is disclosed in the Symposium Record of the 15th International TV Symposium at Montreux, Switzerland, of June 6–12, 1985, at pages 262 to 278, especially page 266, FIG. 2. In that amplifying circuit a recording amplifier having a differential amplifier circuit operates in class B push-pull type of operation. In this type of operation recording current flows through the winding of a recording magnetic head connected to one of the collector connections of the differential amplifier only when a signal is present at the primary winding of the rotary transformer. In this manner of operation, however, the recording current is distorted. Besides, in the idling state of the recording amplifier a small direct current flows in the winding of the recording head which undesirably erases magnetic tapes when there are asymmetries in the circuit branches of the differential amplifier.

SUMMARY OF THE INVENTION

It is an object of the present invention to provide an apparatus circuit of the general kind mentioned above which has no erasing effects when it is idling and produces linear amplification during recording.

Briefly, the recording amplifier connected to a recording head is made switchable, so that it operates as a class A amplifier, but does so only when a signal is present in the rotor of the rotary transformer which supplies signals to the particular magnetic head for recording, while at other times the amplifier is biassed off so that asymmetries in the circuit will not produce direct current in the recording head.

The invention has the advantage that the frequency spectrum of the recording current is not modified by charge transfer or distortions in charge storage effects in the base zones of the transistors of the differential amplifier used for amplifying. Furthermore, the amplifier of the invention accepts no power in the idle condition, so that undesirable direct current erasing of the tape can reliably be prevented.

More particularly, a third transistor for switching the differential amplifier that drives the recording head in and out of class A operation is interposed in series with the bias resistance which is connected to the emitters of both amplifying transistors of the differential amplifier. It is preferably controlled by a monostable circuit which responds to the presence of signals in the rotor of the rotary transformer.

Further details are best explained in the illustrated description that follows.

BRIEF DESCRIPTION OF THE DRAWINGS

The invention is further described by way of illustrative examples with reference to the annexed drawings, in which.

DESCRIPTION OF THE ILLUSTRATED EMBODIMENTS

Figure 1:
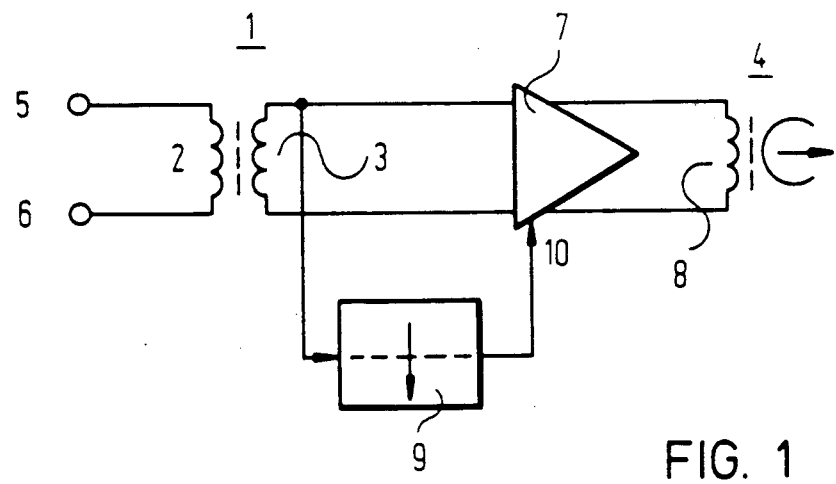
FIG. 1 is a basic diagram for explaining the invention.

In the FIG. 1 block circuit diagram there is shown a rotary transformer 1 having a revolving rotor winding 3 and a fixed stator winding 2. The rotor winding 3 is mechanically coupled to a rotary body, usually called a headwheel (not shown), around the periphery of which a magnetic tape (not shown) is looped in the usual way for oblique track recording. A number of magnetic heads for scanning the tape are fixed on the headwheel. One of these magnetic heads is shown and designated with the reference numeral 4 in FIG. 1. In this embodiment the magnetic head 4 serves for recording a digital video signal. The data rate of the digital video signal applied to the terminals 5 and 6 is, for example 100 megabits per second. The digital video signal is induced in the rotor winding 3 by the stator winding 2 and is then supplied to the input of a switchable recording amplifier 7 which is located on the unshown headwheel along with other switchable recording amplifiers (not shown) and other recording magnetic heads (not shown), as well as other transformer rotors (not shown). The output of the switchable recording amplifier 7 is connected with a winding 8 of the recording magnetic head 4. A monostable multivibrator stage 9 has its control input connected to one of the terminals of the rotor winding 3 and produces a switchover signal for the switchable recording amplifier 7. The switchover signal is supplied to the amplifier 7 by the connection 10.

When a digital video signal is present at the terminals 5 and 6 of the stator winding 2, the monostable circuit 9 is set in its unstable state for a predetermined time interval. The monostable circuit 9 is triggered by pulse flanks that appear in an applied digital video signal. The switchover signal at the output of the monostable circuit 9 puts into class A operation the previously switched off recording amplifier 7 so that the applied digital video signal, linearly amplified, can flow as recording current in the winding 8 of the recording magnetic head 4.

Figure 2:
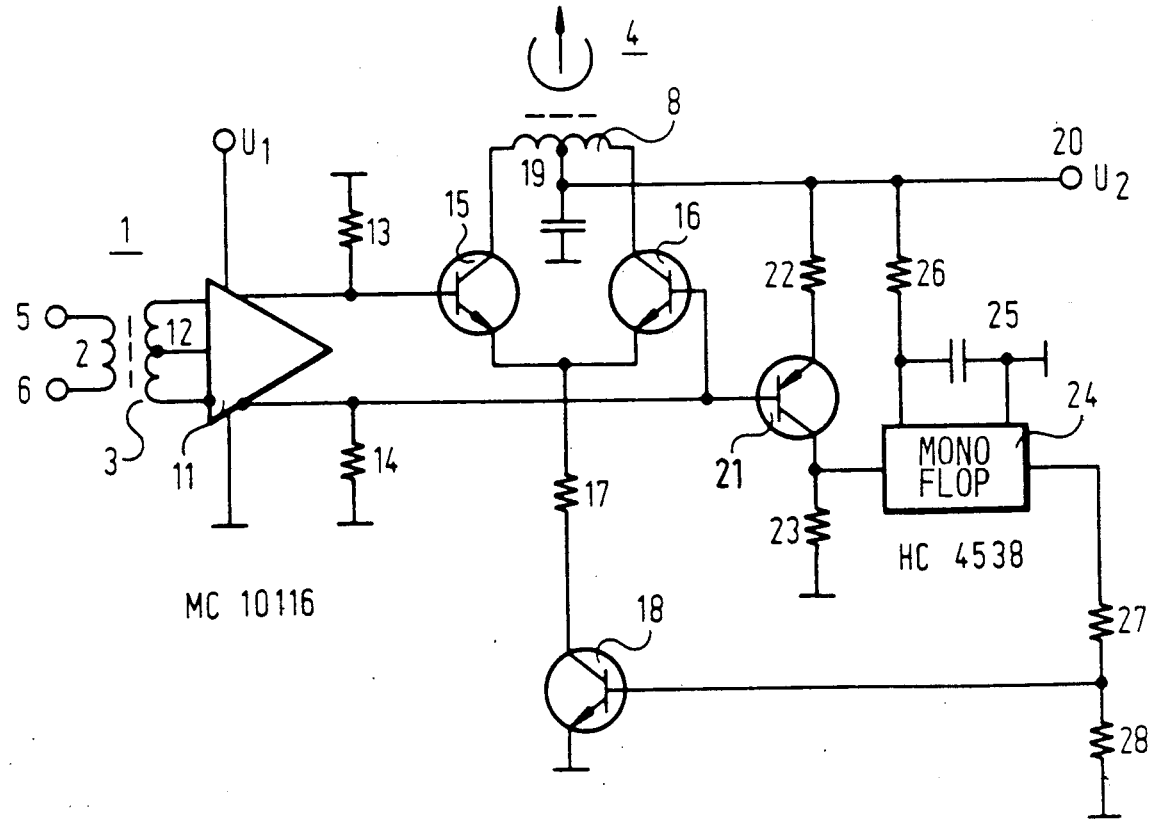
FIG. 2 is a block circuit diagram of a first embodiment of the invention.
Figure 3:
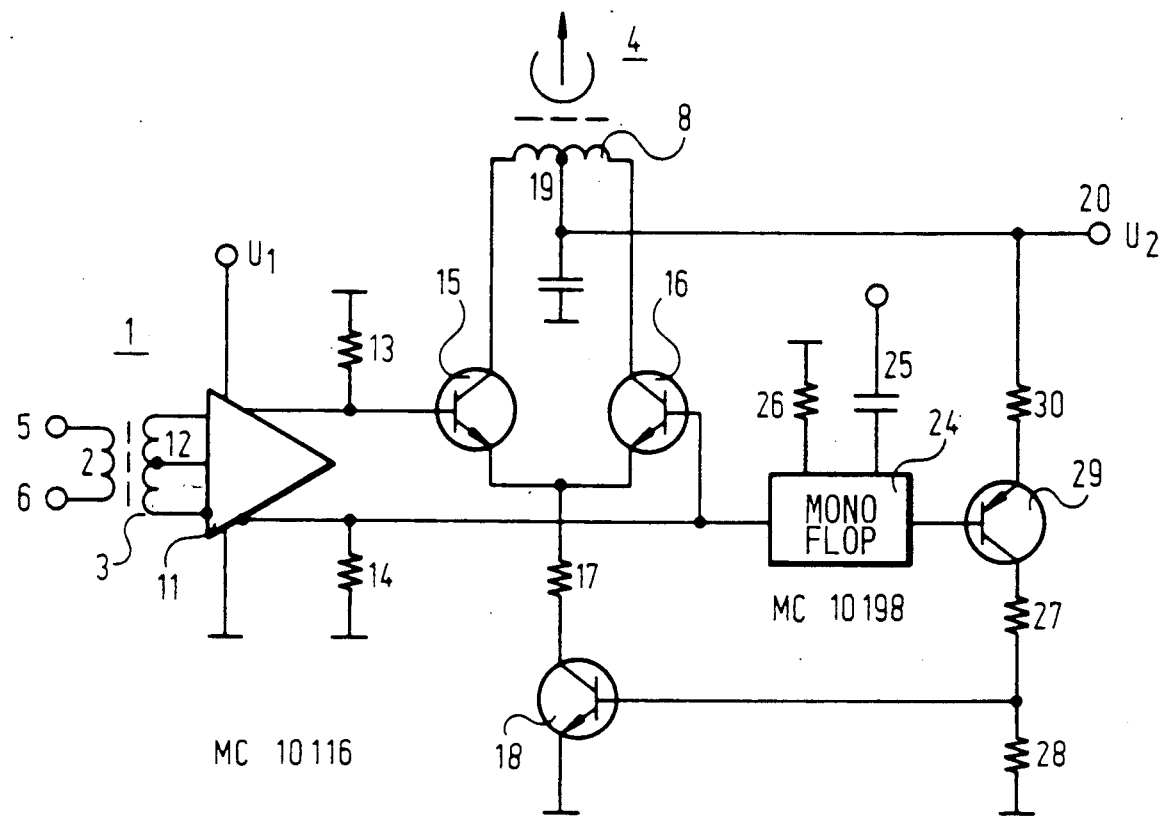
FIG. 3 is a block circuit diagram of the second embodiment of the invention.

The basic diagram of FIG. 1 is shown in more detail in FIGS. 2 and 3, respectively illustrating first and second examples of embodiments. Elements having the same effect are designated with the same reference numbers.

As in the case of the basic diagram of FIG. 1, in FIG. 2 the digital video signal at the terminals 5 and 6 of the stator winding 2 is transmitted to the rotor winding 3 of the rotary transformer 1. The digital signal is preamplified in an input stage 11 before it is further processed. In the illustrated case the input stage 11 consists of a ECL component of type MC 10116 which has symmetrical differential amplifier inputs and outputs. This ECL component also has a connection to which a center tap voltage is made available. The center tap 12 of the rotor winding 3 is connected thereto. Resistances 13 and 14 which are grounded at one end are connected at their other end respectively to the inverting and non-inverting outputs of the ECL component. These resistances 13 and 14 are the emitter resistances of the ECL component. The preamplified digital video signal made available at the two resistances 13, 14 are respectively supplied to the base connections of two transistors 15 and 16. The emitter connections of these two transistors are both connected through a resistance 17 and the collector-emitter path of a transistor 18 to the reference potential designated as ground. The collector connections of the transistors 15 and 16 are respectively connected to the outer (end) connections of the winding 8 of the recording magnetic head 4. The winding 8 has a center tap at 19 through which the operating voltage $U_2$ from the terminal 20 is supplied to the two transistors 15 and 16.

The inverting output of the input stage 11 is also connected to the base electrode of a transistor 21, the emitter of which is connected through a resistance 22 to the operating voltage $U_2$ and the collector of which is connected through a resistance 23 to ground. A signal is taken off a collector connection of the transistor 21 and supplied to the input of a monostable multivibrator stage 24. The time constant of the monostable multivibrator 24 is set to a suitable predetermined value by means of a capacitor 25 and a resistance 26. A voltage divider composed of the resistances 27 and 28 is connected to the output of the monostable multivibrator 24. The common connection of the resistances 27 and 28 is connected to the base electrode of the transistor 18.

As already mentioned, the applied digital video signal is first preamplified in the input stage 11 before it is further processed by the actual recording amplifier that is composed of the transistors 15 and 16 and the resistance 17. The transistors 15 and 16 are connected as a differential amplifier to the resistance 17, which may be regarded as a current source of the differential amplifier, which is dependent upon the output signal of the monostable multivibrator 24, which may be switched on and off by the collector-emitter path of the transistor 18.

The transistor 21 is provided to serve as a level converter in order to raise the ECL level of the input stage 11 to the input logic level of the monostable multivibrator 24. The latter is constituted in the illustrated example as a CMOS component of type HC 4538. The time constant of the monostable multivibrator 24, which is dependent upon the value of the capacitor 25 and the resistance 26, is advantageously so set that data words with longer "zero" and "L" sequences in the digital video signal are bridged over in time. If no digital video signal is present at the terminals 5 and 6 of the stator winding 2, the collector-emitter path of the transistor 18 remains so high in ohm value that no current flows through the branches of the differential amplifiers 15, 16 and the winding 8 of the recording magnetic head remains without current. Unintended erasure by residual direct current components still present is therefore impossible in the idle state of the recording amplifier of the invention.

The circuit embodiment shown in FIG. 3 corresponds in principle to that of FIG. 2. Instead of a CMOS component, an ECL component of type MC 10198 is used as the monostable multivibrator 24. Since this ECL component belongs to the same logic family as the ECL component of the input stage 11, the transistor 21 previously provided for level conversion can be dispensed with and the input of the monostable multivibrator 24 can be directly connected with the inverting output of the input stage 11. The ECL level at the output of the monostable multivibrator 24 must however be raised thereafter with a transistor 29 and a resistance 30 in order to steer the switch formed by the transistor 18 from a conducting state to a sufficiently high resistance state.

The two embodiments respectively shown in FIGS. 2 and 3 represent merely illustrative embodiments. Other circuit variations, for example variations which use other signal detectors instead of the illustrated pulse-flank-triggered monostable multivibrators are likewise useable.

It will thus be seen that although the invention has been described with reference to particular illustrative embodiments, further variations and modifications are possible within the inventive concept.

I claim:

1. A digital magnetic recording circuit for a recording/reproducing apparatus which records signals on a magnetic tape on oblique tracks, said recording/reproducing apparatus comprising a rotary drum having a plurality of magnetic heads distributed around its periphery for recording the digital signals on the magnetic tape while it is guided in a loop around the drum;

rotary transformers (1) which, respectively, are connected to each of said magnetic heads for supplying the digital signals thereto, each of said rotary transformers having a rotor (3) mounted for rotation with said drum and a stator (2) mounted independently of said drum;

a recording amplifier connected to each said rotor (3) and to a corresponding magnetic head, each said amplifier comprising a current source (17) for supplying a constant current and switching means (15, 16) for selectively applying the constant current of said current source (17) in a forward and in a reverse direction to the corresponding magnetic head in response to the digital signals;

said recording circuit being characterized in that each said amplifier further comprises:

a switching element (18) inserted in the path of said constant current for controllably interrupting all flow of current in said current source (17) and control means (9; 21 to 26) for controlling the switching element (18) interrupt all flow of current in said current source (17) during the absence of digital signal transmission through a corresponding one of said rotary transformers (1).

2. A digital magnetic recording circuit for a recording/reproducing apparatus which records signals on a magnetic tape on oblique tracks, said recording/reproducing apparatus comprising a rotary drum having a plurality of magnetic heads distributed around its periphery for recording the digital signals on the magnetic tape while it is guided in a loop around the drum;

rotary transformers (1) which, respectively, are connected to each of said magnetic heads for supplying the digital signals thereto, each of said rotary transformers having a rotor (3) mounted for rotation with said drum and a stator (2) mounted independently of said drum;

a recording amplifier connected to each said rotor (3) and to a corresponding magnetic head, each said amplifier comprising a current source (17) for supplying a constant current and switching means (15, 16) for selectively applying the constant current of said current source (17) in a forward and in a reverse direction to the corresponding magnetic head in response to the digital signals, each said amplifier comprising a first differential amplifier including first, second and third transistors (15, 16, 18), the emitters of said first and second transistors (15, 16) being connected through a resistance (17) common to both said transistors and through the collector emitter path of said third transistor (18) to a first fixed potential, the collectors of said first and second transistors (15, 16) being respectively connected to opposite ends of winding (8) of said recording head (4), said winding (8) having a center tap (19) connected to a second fixed potential, the base electrodes of said first and second transistors (15, 16) being respectively connected for supply thereto in phase opposition of signals transmitted by the said transformer rotor, said third transistor being a switching element inserted in the path of said constant current, and control means (9; 21 to 26) for controlling said third transistor to inhibit the operation of said current source (17) during the absence of digital signal transmission through a corresponding one of said rotary transformers (7) by providing a switchover signal to said third transistor.

3. The circuit of claim 2, wherein said control means include a monostable multivibrator stage (9, 24) having an input connected for receiving a signal from said rotor and an output for supplying said switchover signal to said third transistor.

4. The circuit of claim 2, wherein said amplifier includes a second differential amplifier (11) interposed between said rotor and said first differential amplifier and having an inverting and a non-inverting input, an inverting and a non-inverting output and an additional output for supplying a third fixed potential, said base electrodes of said first and second transistors (15, 16) of said first differential amplifier being connected respectively to said inverting and non-inverting outputs of said second differential amplifier, said rotor of said rotary transformer having a center tap which is connected to said additional output of said second differential amplifier (11) and also having winding end connections respectively connected to said inverting and non-inverting inputs of said second differential amplifier (11).

5. The circuit of claim 4, wherein a controllable level converter (21, 22, 23) is provided in said control means for controlling said monostable multivibrator stage (24) in response to a signal of said second differential amplifier (11).

6. The circuit of claim 4, wherein said monostable multivibrator stage (24) has its input connected with one of said outputs of said second differential amplifier (11) and wherein a level converter (29) is interposed in circuit between the output of said monostable multivibrator stage (24) and the base electrodes of said third transistor (18) of said first differential amplifier.

* * * * *